United States Patent
Sorin

(10) Patent No.: US 6,847,742 B2
(45) Date of Patent: Jan. 25, 2005

(54) TUNABLE DYNAMIC GAIN FLATTENING FILTER USING POLARIZATION DELAYS

(75) Inventor: Wayne V. Sorin, Mountain View, CA (US)

(73) Assignee: Novera Optics, Inc., Palo Alto, CA (US)

(*) Notice: Subject to any disclaimer, the term of this patent is extended or adjusted under 35 U.S.C. 154(b) by 292 days.

(21) Appl. No.: 09/811,146

(22) Filed: Mar. 15, 2001

(65) Prior Publication Data

US 2002/0003658 A1 Jan. 10, 2002

Related U.S. Application Data

(63) Continuation-in-part of application No. 09/765,971, filed on Jan. 19, 2001, now Pat. No. 6,631,224, which is a continuation-in-part of application No. 09/729,661, filed on Dec. 4, 2000, now Pat. No. 6,510,261, which is a continuation-in-part of application No. 09/666,763, filed on Sep. 21, 2000, now Pat. No. 6,539,148, which is a continuation-in-part of application No. 09/571,092, filed on May 15, 2000, now Pat. No. 6,253,002, which is a continuation of application No. 09/425,099, filed on Oct. 22, 1999, now Pat. No. 6,233,379, which is a continuation-in-part of application No. 09/022,413, filed on Feb. 12, 1998, now Pat. No. 6,021,237.

(60) Provisional application No. 60/206,767, filed on May 23, 2000.

(30) Foreign Application Priority Data

Jun. 6, 1997 (KR) .............................. 97-24796

(51) Int. Cl.[7] .......................... G02F 1/335; H04J 14/02
(52) U.S. Cl. ................... 385/7; 385/11; 385/14; 385/27; 385/39; 385/42; 398/53; 398/82; 398/85
(58) Field of Search ................... 385/7, 11, 14, 385/15, 27, 28, 29, 39, 42, 43, 126, 127, 140; 359/180, 181, 188, 322, 239, 245, 246, 115, 127, 130, 124, 154, 189, 195; 398/53, 82, 85

(56) References Cited

U.S. PATENT DOCUMENTS

| 4,971,417 | A |   | 11/1990 | Krinsky et al. ............ 372/6 X |
|-----------|---|---|---------|------------------------------------|
| 5,596,661 | A | * | 1/1997  | Henry et al. .................. 385/24 |
| 5,805,751 | A |   | 9/1998  | Kewitsch et al. ............. 385/43 |
| 5,850,491 | A | * | 12/1998 | Morasca et al. ............... 385/7 |
| 6,021,237 | A | * | 2/2000  | Kim et al. .................... 385/28 |
| 6,151,157 | A |   | 11/2000 | Ball et al. ................... 359/341 |
| 6,151,427 | A |   | 11/2000 | Satorius ....................... 385/7 |
| 6,233,379 | B1 | * | 5/2001 | Kim et al. .................... 385/28 |
| 6,253,002 | B1 | * | 6/2001 | Kim et al. .................... 385/27 |
| 6,289,699 | B1 |   | 9/2001 | Kewitsch et al. ............. 65/406 |
| 6,292,290 | B1 |   | 9/2001 | Wan et al. ................. 359/337.1 |
| 6,429,962 | B1 | * | 8/2002 | Xu et al. .................. 359/337.1 |
| 6,510,261 | B2 | * | 1/2003 | Sorin et al. ................... 385/27 |
| 6,522,456 | B2 | * | 2/2003 | Chen et al. .................. 359/322 |
| 6,539,148 | B1 | * | 3/2003 | Kim et al. .................... 385/27 |
| 6,631,224 | B2 | * | 10/2003 | Sorin et al. .................. 385/28 |
| 2002/0085252 | A1 | * | 7/2002 | Chen et al. ................. 359/122 |

FOREIGN PATENT DOCUMENTS

KR      10-0265865      6/2000      .................. 385/28

OTHER PUBLICATIONS

Sorin, W.V. et al, "Phase Velocity Measurements using Prism Output for Single and Few–Mode Fibers", *Optics Letters*, Feb. 1986, vol. 11, No. 2, pp. 106–108.

(List continued on next page.)

*Primary Examiner*—Brian M. Healy
(74) *Attorney, Agent, or Firm*—Blakely, Sokoloff, Taylor & Zafman LLP

(57) ABSTRACT

A dynamic gain flattening filter includes a first filter stage. The first filter stage has a first tunable coupling member and a first differential delay with first and second tunable delay paths. The first tunable coupling member adjusts an amount of power of the optical signal that is divided onto the first and second tunable delay paths of the first differential delay.

65 Claims, 3 Drawing Sheets

OTHER PUBLICATIONS

Blake, B.Y. et al, "Fiber–Optic Modal Coupler using Periodic Microbending", *Optics Letters,* Mar. 1986, vol. 11, No. 3, pp. 177–179.

Kim, B.Y. et al., "All–Fiber Acousto–Optic Frequency Shifter", *Optics Letters,* Jun. 1986, vol. 11, No. 6, pp. 389–391.

Sorin, W.R. et al, "Highly Selective Evanescent Modal Filter fot Two–Mode Optical Fibert", *Optics Letters,* Sep. 1986, vol. 11, No. 9, pp. 581–583.

Blake, J.N. et al, "Analysis of Intermodal Coupling in a Two–Mode Fiber with Periodic Microbends", *Optics Letters,* Apr. 1987, vol. 12, No. 4, pp. 281–283.

Kim, B.Y. et al, "Use of Highly Elliptical Core Fibers for Two–Modes Fiber Devices", *Optics Letters,* Sep. 1987, vol. 12, No. 9, pp. 729–731.

Blake, J.N. et al, "Strain Effects on Highly Elliptical Core Two–Mode Fibers", *Optics Letters,* Sep. 1987, vol. 12, No. 9, pp. 732–734.

Engan, H.E. et al, Propagation and Optical Interaction of Guided Acoustic Waves in Two–Mode Optical Fibers, *IEEE Journal of Lightwave Technology,* Mar. 1988, vol. 6, No. 3, pp. 428–436.

Park, H.G. et al, "Intermodal Coupler using Permanently Photo–Indiced Grating in Two–Mode Optical Fibre", *Electronic Letters,* Jun. 8, 1989, vol. 14, No. 12, pp. 797–799.

Park, H.G. et al, "All–Optical Intermodl Switch using Periodic Coupling in a Two–Mode Waveguide", *Optics Letters,* Aug. 15, 1989, vol. 14, No. 16, pp. 877–879.

Huang, S.Y. et al, "Perturbation Effects on Mode Propagation in Highly Elliptical Core Two–Mode Fibers", *IEEE Journal of Lightwave Technology,* Jan. 1990, vol. 8, No. 1, pp. 23–33.

Koh, Y.W. et al, "Strain Effects on Two Mode Fiber Gratings", *Optics Letters,* Apr. 1, 1993, vol. 18, No. 7, pp. 497–499.

Yun, S.H. et al, "All–fiber Tunable Filter and Laser based on Two–mode Fiber", *Optics Letters,* Jan. 1996, vol. 21, No. 1, pp. 27–29.

Yun, S.H. et al, "Suppression of Polarization Dependence in a Two–Mode Fiber Acousto–Optic Device", *Optics Letters,* Jun. 15, 1996, vol. 21, No. 12, pp. 908–910.

Kim, H.S. et al, "Longitudinal Mode Control in Few–Mode Erbium–Doped Fiber Lasers", *Optics Letters,* Aug. 1, 1996, vol. 21, No. 15, pp. 1144–1146.

Jeon, M.Y. et al, "An Electronically Wavelength–Tunable Mode–Locked Fiber Laser Using an All–Fiber Acoustooptic Tunable Filter",*IEEE Photonics Technology Letters,* Dec. 1996, vol. 8, No. 12, pp. 1618–1620.

Kim, H.S. et al, "All–fiber acousto–optic tunable notch filter with electronically controllable profile", *Optics Letters,* Oct. 1, 1997, vol. 22, No. 19, pp. 1476–1478.

Yun, S.H. et al, "Wavelenght–Swept Fiber Laser with Frequency Shifted Feedback and Resonantly Swept Intra–Cavity Acoustooptic Tunable Filter", *IEEE Journal of Selected Topics in Quantum Electronics,* Aug. 1997, vol. 3, No. 4, pp. 1087–1096 (Invited Paper).

Jeon, M.Y. et al, "Harmonically mode–locked fiber laser with an acoutso–optic modulator in a Sagnac loop and Faraday rotating mirror cavity", *Optics Communications,* Apr. 15, 1998, vol. 149, pp. 312–316.

Kim, H.S. et al, "Actively gain–flattened erbium–doped fiber amplifier over 35nm using all–fiber acoustooptic tunable filters", *IEEE Photonics Technology Letters,* Jun. 1998, vol. 10, No. 6, pp. 790–792.

Hwang, I.K. et al, "Long–period fiber gratings based on periodic microbends", *Optics Letters,* Sep. 15, 1999, vol. 24, No. 18, pp. 1263–1265.

Yun, S.H. et al, "Dynamic Erbium–Doped Fiber Amplifier Based on Active Gain Flattening with Fiber Acoustooptic Tunable Filters", *IEEE Photonics Technology Letters,* Oct. 1999, vol. 11, No. 10, pp. 1229–1231.

Blake, J.N. et al, "All–Fiber Acousto–Optic Frequency Shifter using Two–Mode Fiber", *Proceedings of the SPIE Fiber Optic Gyros,* Sep. 1986, vol. 719, pp. 92–100.

Blake, B.Y. et al, "Acousto–Optic Frequency Shifting in Two–Mode Optical Fibers", *OFS '86, Tokyo, Japan,* Oct. 8–10, 1988, pp. 159–162.

Engan, H.E. et al, "Optical Frequency Shifting in Two–Mode Optical Fibers by Flexural Acoustic Waves", *IEEE 1986 Ultrasonics Symposium,* Nov. 17–19, 1986, pp. 435–438.

Huang, S.Y. et al, "Mode–Characteristics of Highly Elliptical Core Two–Mode Fibers under Purterbations", *OFS '88, New Orleans, Louisiana,* Jan. 27–29, 1988, pp. 14–17.

Kim, B.Y. et al, "Few–Mode Fiber Devices", *OFS '88, New Orleans, Louisiana,* Jan. 27–29, 1988, pp. 146–149, (Invited Paper).

Kim, B.Y. et al, "Fiber–Optic Device Research at Stanford University", *Proceedings SPIE, Fiber Optic and Laser Sensors, Boston Massachusetts,* Sep. 5–7, 1989, vol. 1169, pp. 10–15, (Invited Paper).

Kim, B.Y. et al, "Few–Mode Fiber Devices", *ICOESE '90, Beijing, China,* Aug. 1990, vol. 2, pp. 146–149, (Invited Paper).

Koh, Y.W. et al, "Mode Coupling Fiber Gratings for Fiber Optic Devices", *OFS–9, Firenze, Italia,* May 4–6, 1993, pp. 35–38.

Yun, S.H. et al, "All–Fiber Acousto–Optic Tunable Filter", *OFC '95, San Diego, California,* Feb. 26–Mar. 3, 1995, pp. 186–187.

Yun, S.H. et al, "Electronically Tunabole Fiber Laser Using All–Fiber Acousto–Optic Tunable Filter", *IOOC '95 ($10^{th}$ International Conference on Integrated Optics and Optical Fibre Communication) Hong Kong,* Jun. 26–30, 1995, pp. 22–23.

Yun, S.H. et al, "Polarization Dependenceof Two–Mode Fiber–Acousto–Optic Device", *OFS–11, Sapporo, Hokkaido, Japan,* May 21–24, 1996, pp. 478–481.

Jeon, M.Y. et al, "Harmonically Mode–Locked Fiber Using an All–Fiber Acousto–Optic Tunable Filter", *OFC '97, Dallas, Texas,* Feb. 16–22, 1997, pp. 166–167.

Yun, S.H. et al, "Wavelength–swept Fiber Lawer with Frequency–Shifted Feedback", *OFC '97, Dallas, Texas,* Feb. 16, 1997, pp. 30–31.

Kim, H.S. et al, "Single–Mode–Fiber Acousto–Optic Tunable Notch Filter", $2^{nd}$ *Optoelectronics & Communications Conference '97,* Jul. 8–11, 1997, pp. 226–227.

Yun, S.H. et al, "Fiber grating sensor array demodulation using wavelength–swept fiber laser", *OFS–12, Williamsburg, Virginia,* Oct. 28–31, 1997.

Hwang, I.K. et al, "All–fiber nonreciprocal comb filter with wavelength tunability", *OFC '98, ThQ5, San Jose, USA,* Feb. 22–27, 1998, pp. 336–338.

Kim, H.S. et al, "Dynamic gain equalization of erbium–doped filter amplifier with all–fiber–acousto–optic tunable filters", *OFC '98, WG4, San Jose, USA,* Feb. 22–27, 1998, pp. 136–138.

Koh, Y.W. et al, "Broadband Polarization–Insensitive All–Fiber Acousto–Optic Modualtor", *OFC '98, WM50, San Jose, USA,* Feb. 22–27, vol. 2, pp. 239–240.

Oh, K. et al, "Characterization of elliptic core fiber acousto–optic tunable filters operated in the single mode and the multi–mode range", *OFC '98, WM50, San Jose, USA,* vol. 2, pp. 250–251.

Yun, S.H. et al, "Generation of self–starting mode–locked pulses in wavelength–swept fiber lasers", *CLEO/IQEC '98, San Francisco, USA,* May 3–8, 1998.

Hwang, I.K. et al, "Long–Period Gratings based on Arch–induced Microbends", *OECC '98, Chiba, Japan,* Jul. 12–16, 1998, pp. 144–145.

Kim, B.Y. et al, "Fiber Based Acousto–Optic Filters", *OFC/IOOC '99, San Diego, USA,* Feb. 21–26, 1999, pp. 199–201 (Invited Paper).

Hwang, I.K. et al, "Profile–controlled long–period fiber gratings based on microbends", *OFC/IOOC '99, San Diego, California,* Feb. 21–26, 1999, pp. 177–179.

Park, H.S. et al, "All–fiber add–drop multiplexer using a tilted fiber Bragg grating and mode–selective couplers", *OFC/IOOC '99, San Diego, California, USA,* Feb. 21–26, 1999, TuH6, pp. 91–93.

Kim, B.Y., "Acousto–optic Components for WDM Applications", *IEEE/LEOS Summer Topical Meetings, San Diego, USA,* Jul. 26–28, 1999, pp. 47–48 (Invited Paper).

Kim, B.Y., "Acousto–optic filters for fiber systems", *ICO–128, San Francisco, USA,* Aug. 2–6, 1999, pp. 92–93, (Invited Paper).

Song, K.Y. et al, "High Performance Fused–type Mode Selective Couple for Two–mode Fiber Devices", *OFC 2000, Baltimore, USA,* Mar. 5–10, 2000, vol. 37, TuB5.

Risk, W.P. et al, "Acousto–optic frequency shifting in birefringent fiber", *Optics Letters,* 1984, vol. 9, No. 7, pp. 309–311.

Birks, T.A. et al, "Four–port fiber frequency shifter with a null tapre coupler", *Optics Letters,* 1994, vol. 19, No. 23, pp. 1964–1966.

Berwick, M. et al, "Coaxial optical–fiber frequency shifter", *Optics Letters,* Feb. 15, 1992, vol. 17, No. 4, pp. 270–272.

Lisboa, O. et al, "New configuration for an optical fiber acousto–optic frequency shifter", *Proc. Soc. Photo–Opt. Instrum. Eng.,* Mar. 13–14, 1990, vol. 1267, pp. 17–23.

Culverhouse, D.O. et al, "Four port fused taper acousto–optic deviceusing standard single mode telecommunication fiber", *Electronic Letters,* Jul. 20, 1995, vol. 31, No. 15, pp. 1279–1280.

Culverhouse, D.O. et al, "Low–loss all–fiber acousto–optic tunable filter", *Optic Letters,* 1997, vol. 22, No. 2, pp. 96–98.

Dimmick, T.E. et al., "Compact all–fiber acoustooptic tunable filters with small bandwidth–length product", *IEEE Photonics Technology Letters,* Sep. 2000, vol. 12, No. 9, pp. 1210–1212.

Kakarantzas, G. et al, "High strain–induced wavelength tunability in tapered fibre acousto–optic filters", *Electronics Letters,* Jul. 6, 2000, vol. 36, No. 14, pp. 1187–1188.

Dimmick, T.E. et al, "Narrow–band acousto–optic tunable filter fabricated from highly uniform tapered optical fiber", *Optical Fiber Communication Conference, 2000,* 2000, vol. 4, pp. 25–27.

Russell, P.S.J. et al, "All–Fibre Frequency Shifters, Modulators and Switches", *Lasers and Electro–Optics Europe, 1988,* 1998, p. 349.

Birks, T.A. et al, "Control of bandwidth in fiber acousto–optic tunable filters and other single–mode null coupler devices", *Lasers and Electro–Optics, 1997,* 1997, vol. 11, pp. 444–445.

Culverhouse, D.O. et al, "40–MHz all–fiber acoustooptic frequency shiter", *IEEE Photonics Technology Letters,* Dec. 1996, vol. 8, No. 12, pp. 1636–1637.

Birks, T.A. et al, "The acousto–optic effect in single–mode fiber tapers and couplers",*Journal of Lightwave Technology,* Nov. 1996, vol. 14, No. 11, pp. 2519–2529.

Culverhouse, D.O. et al, "All–fibre Acousto–optic Tunable Filter Based On a Null Coupler", *Optical Communication 1996, ECOC '96,* 1996, vol. 3, pp. 317–320.

Birks, T.A. et al, "Low power acousto–optic device based on a tapered single–mode fiber", *IEEE Photonics Technology Letters,* Jun. 1994, vol. 6, No. 6, pp. 725–727.

Zayer, N.K. et al, "In situ ellipsometric monitoring of growth of zinc oxide thin films with applications to high–frequency fiber acousto–optic components", *Lasers and Electro–Optics, 1998, CLEO '98,* 1998, pp. 251–252.

Pannell, C.N. et al, "In–fiber and fiber–compatible acoustooptic components", *Journal of Lightwave Technology,* Jul. 1995, vol. 13, No. 7, pp. 1429–1434.

Abdulhalim, I. et al, "Acoustooptic in–fiber modulator acoustic focusing", *IEEE Photonics Technology Letters,* Sep. 1993, vol. 5, No. 9, pp. 999–1002.

Huang, D.W. et al, "Q–switched all–fiber laser with an acoustically modulated fiber attenuator", *IEEE Photonics Technology Letters,* Sep. 2000, vol. 12, No. 9, pp. 1153–1155.

Huang, D.W. et al, "Reflectivity–tunable fiber Bragg grating reflectors", *IEEE Photonics Technology Letters,* Feb. 2000, vol. 12, No. 2, pp. 176–178.

Liu, W.F. et al, "Switchable narrow bandwidth comb filter based on an acoustooptic superlattice modulator in Sinc–sampled fiber gratings", *Lasers and Electro–Optics, 1999,* 1999, pp. 77–78.

Liu, W.F. et al, "100% efficient narrow–band acoustooptic tunable reflector using fiber Bragg grating", *Journal of Lightwave Technology,* Nov., 1998, vol. 16, No. 11, pp. 2006–2009.

Patterson, D.B. et al, "Frequency shifting in optical fiber using a Saw Horn", *Ultrasonics Symposium, 1990,* 1990, vol. 2, pp. 617–620.

Patterson, D.B. et al, "Noninvasive switchable acousto–optic taps for optical fiber", *Journal of Lightwave Technology,* Sep. 1990, vol. 8, No. 9, pp. 1304–1312.

J.N. Blake, B.Y. Kim, H.E. Engan, and H.J. Shaw, "Analysis of intermodal coupling in a two–mode fiber with periodic microbends", Opt. Lett., vol. 12, 281–283 (1987).

B.Y. Kim, J.N. Blake, H.E. Engan, and H.J. Shaw, "Acousto–optic frequency–shifting in two–mode optical fibers", OFS '86, Tokyo, Japan (Oct. 8–10, 1986).

H.E. Engan, B.Y. Kim, J.N. Blake, and H.J. Shaw, "Propagation and optical interaction of guided acoustic waves in two–mode optical fibers", Journal of Lightwave Technology, vol. 6, 428–436 (1988).

J.O. Askautrud and H.E. Engan, "Fiberoptic frequency shifter with no mode change using cascaded acousto–optic interaction regions", Opt. Lett., vol. 15, 649–651 (1990).

H.E. Engan, T. Myrtveit, and J.O. Askautrud, "All fiber acousto–optic frequency shifter excited by focused surface acoustic waves", Opt. Lett., vol. 16, 24–26 (1991).

H,E. Engan, D. Östling, P.O. Kval, and J.O. Askautrud, "Wideband operation of horns for excitation of acoustic modes in optical fibers", Proc. OFS(10), Glasgow, 11th–13th Oct. 1994, 568–571 (SPIE Proc. 2360).

D. Östling and H.E. Engan, "Narrow–band acousto–optic tunable filtering in a two–mode fiber", Opt. Lett., vol. 20, 1247–1249 (1995).

H.E. Engan, "Analysis of polarization mode coupling by acoustic torsional waves in optical fibers", J. Opt. Soc. Am. A., vol. 13, 112–118 (1996).

D. Östling and H.E. Engan: "Spectral flattening by an all–fiber acousto–optic tunable filter", 1995 IEEE Ultrasonics Symposium, 837–840.

D. Östrling and H.E. Engan: "Broadband spatial mode conversion by chirped fiber bending", Opt. Lett., vol. 21, 192–194 (1996).

D. Östling and H.E. Engan: "Polarization–selective mode coupling in two–mode Hi–Bi fibers", Journal of Lightwave Technology, vol. 15, 312–320 (1997).

D. Östling, B. Langli, and H.E. Engan: "Intermodal beat lengths in birefringent two–mode fibers", Opt. Lett., vol. 21, 1553–1555 (1996).

H.E. Engan, "Acoustic torsional waves used for coupling between optical polarization modes in optical fibers", 1996 IEEE Ultrasonics Symposium, 799–802.

D. Östling and H.E. Engan: "Acousto–optic tunable filters in two–mode fibers", Optical Fiber Technology, vol. 3, 177–183 (1997).

B. Langli, P. G. Sinha and K. BlØtekjær, *"Acousto–Optic Mode Coupling of Partially Coherent Light in Two–Mode Fibers"*, Optical Review, vol. 4, No. 1A, pp. 121–129, Jan./Feb. 1997.

T.A. Birks, P.S.J. Russell and C.N. Pannell, "Low power acousto–optic device based on a tapered single–mode fiber", IEEE Photonics Technol. Lett., vol. 6, p. 725–727 (1994).

M. Berwick and D.A. Jackson, "Coaxial optical–fiber frequency shifter", Opt. Lett., vol. 17, 270–272 (1992).

J. Blake and P. Siemsen, "Practical compact high performance fiber–optic frequency shifter", Proc. 9$^{th}$ OFS Conference, Firenze, pp. 301–304 (1993).

W. P. Risk, G. S. Kino and H. J. Shaw, "Fiber–optic frequency shifter using a surface acoustic wave incident at an oblique angle", Optics Letters, vol. 11, No. 2, pp 115–117, 1986.

W. P. Risk, R. C. Youngquist, G. S. Kino and H. J. Shaw, "Acousto–optic frequency shifting in birefringent fiber", Optics Letters, vol. 9, No.7, pp. 309–311, 1984.

W. P. Risk and–G. S. Kino, "Acousto–optic fiber–optic frequency shifter using periodic contact with a copropagating surface acoustic wave", Optics Letters, vol. 11, No. 5, pp 336–338, 1986.

W. P. Risk and G. S. Kino, "Acousto–optic polarization coupler and intensity modulator for birefringent fiber", Optics Letters, vol. 11, No. 1, pp 48–50, 1986.

W.P. Risk, G.S. Kino and B.T. Khuri–Yakub, "Tunable optical filter in fiber–optic form", Opt. Lett., vol. 11, p. 578–580 (1986).

S.F. Su, R. Olshansky, D.A. Smith and J.E. Baran, "Flattening of erbium–doped fibre amplifier gain spectrum using an acousto–optic tunable filter", Electron. Lett., vol. 29, p. 477–478 (1993).

Yijiang Chen, "Acousto–optic frequency shifter using coaxial fibers", Optical and Quant. Elect., vol. 21, pp. 491–498 (1989).

J. Ji, D. Uttam and B. Culshaw, "Acousto–optic freuquency shifting in ordinary single–mode fibre", Electronics Letters, vol. 22, No. 21, pp. 1141–1142, 1986.

C. N. Pannell, R. P. Tatam, J. D. C. Jones and D. A. Jackson, "Optical frequency shifter using linearly birefringent monomode fibe", Electronics Leters, vol. 23, No. 16, pp 847–848, 1987.

K. Nosu, H. F. Taylor, S. C. Rashleigh and J. F. Weller, "Acousto–optic phase modulator and frequency shifter for single–mode fibers", Ultrasonics Symposium, pp 476–481, 1983.

A.M. Vengsarkar, et al., "Long–Period Fiber–Grating–Based Gain Equalizers," Optical Letters, vol. 21, No. 5, pp. 336–338 (1996).

K Sugden, L. Zhang, J. Williams, R.W. Fallon, L.A. Everall, K.E. Chisholm and I. Bennion, "Fabrication and characterization of bandpass filters based on concatenated chirped fiber gratings," Journal of Lightwave Technology, vol. 15, No. 8, pp. 1424–1432 (Aug. 1997).

* cited by examiner

TUNABLE DYNAMIC GAIN FLATTENING FILTER USING POLARIZATION DELAYS

CROSS-REFERENCE TO RELATED APPLICATIONS

This application is a continuation-in-part of Ser. No. 09/765,971 filed Jan. 19, 2001, which has issued as U.S. Pat. No. 6,631,224 B2, which is a continuation-in-part of Ser. No. 09/729,661 filed Dec. 4, 2000, which has issued as U.S. Pat. No. 6,510,261, which is a continuation-in-part of Ser. No. 09/666,763 filed on Sep. 21, 2000, which has issued as U.S. Pat. No. 6,539,148, which application claims the benefit of priority from Provisional Patent Application Ser. No. 60/206,767, filed on May 23, 2000, Ser. No. 09/666,763 also being a continuation in part of Ser. No. 09/571,092 filed May 15, 2000, which has issued as U.S. Pat. No. 6,253,002, which is a continuation-in-part of Ser. No. 09/425,099 filed Oct. 22, 1999, which has issued as U.S. Pat. No. 6,233,379, which is a continuation-in-part of Ser. No. 09/022,413 filed Feb. 12, 1998, which has issued as U.S. Pat. No. 6,021,237, which claims priority to KR 97-24796 filed Jun. 16, 1997, which issued as Korean patent number 10-0265865 on Jun. 17, 2000, all of which applications as are fully incorporated herein by reference.

BACKGROUND OF THE INVENTION

1. Field of the Invention

This invention relates generally to tunable band-rejection filters, and more particularly to tunable band-rejection filters using fixed and tunable polarization delays.

2. Description of Related Art

In modern telecommunication systems, many operations with digital signals are performed on an optical layer. For example, digital signals are optically amplified, multiplexed and demultiplexed. In long fiber transmission lines, the amplification function is performed by Erbium Doped Fiber Amplifiers (EDFA's). The amplifier is able to compensate for power loss related to signal absorption, but it is unable to correct the signal distortion caused by linear dispersion, 4-wave mixing, polarization distortion and other propagation effects, and to get rid of noise accumulation along the transmission line. For these reasons, after the cascade of multiple amplifiers the optical signal has to be regenerated every few hundred kilometers. In practice, the regeneration is performed with electronic repeaters using optical-to-electronic conversion. However to decrease system cost and improve its reliability it is desirable to develop a system and a method of regeneration, or signal refreshing, without optical to electronic conversion. An optical repeater that amplifies and reshapes an input pulse without converting the pulse into the electrical domain is disclosed, for example, in the U.S. Pat. No. 4,971,417, Radiation-Hardened Optical Repeater". The repeater comprises an optical gain device and an optical thresholding material producing the output signal when the intensity of the signal exceeds a threshold. The optical thresholding material such as polydiacetylene thereby performs a pulse shaping function. The nonlinear parameters of polydiacetylene are still under investigation, and its ability to function in an optically thresholding device has to be confirmed.

Another function vital to the telecommunication systems currently performed electronically is signal switching. The switching function is next to be performed on the optical level, especially in the Wavelength Division Multiplexing (WDM) systems. There are two types of optical switches currently under consideration. First, there are wavelength insensitive fiber-to-fiber switches. These switches (mechanical, thermo and electro-optical etc.) are dedicated to redirect the traffic from one optical fiber to another, and will be primarily used for network restoration and reconfiguration. For these purposes, the switching time of about 1 msec (typical for most of these switches) is adequate; however the existing switches do not satisfy the requirements for low cost, reliability and low insertion loss. Second, there are wavelength sensitive switches for WDM systems. In dense WDM systems having a small channel separation, the optical switching is seen as a wavelength sensitive procedure. A small fraction of the traffic carried by specific wavelength should be dropped and added at the intermediate communication node, with the rest of the traffic redirected to different fibers without optical to electronic conversion. This functionality promises significant cost saving in the future networks. Existing wavelength sensitive optical switches are usually bulky, power-consuming and introduce significant loss related to fiber-to-chip mode conversion. Mechanical switches interrupt the traffic stream during the switching time. Acousto-optic tunable filters, made in bulk optic or integrated optic forms, (AOTFs) where the WDM channels are split off by coherent interaction of the acoustic and optical fields though fast, less than about 1 microsecond, are polarization and temperature dependent Furthermore, the best AOTF consumes several watts of RF power, has spectral resolution about 3 nm between the adjacent channels (which is not adequate for current WDM requirements), and introduces over 5 dB loss because of fiber-to-chip mode conversions.

Another wavelength-sensitive optical switch may be implemented with a tunable Fabry Perot filter (FTPF). When the filter is aligned to a specific wavelength, it is transparent to the incoming optical power. Though the filter mirrors are almost 100% reflective no power is reflected back from the filter. With the wavelength changed or the filter detuned (for example, by tilting the back mirror), the filter becomes almost totally reflective. With the optical circulator in front of the filter, the reflected power may be redirected from the incident port. The most advanced TFPF with mirrors built into the fiber and PZT alignment actuators have only 0.8 dB loss. The disadvantage of these filters is a need for active feedback and a reference element for frequency stability.

A VOA is an opto-mechanical device capable of producing a desired reduction in the strength of a signal transmitted through a optical fiber. Ideally, the VOA should produce a continuously variable signal attenuation while introducing a normal or suitable insertion loss and exhibiting a desired optical return loss. If the VOA causes excessive reflectance back toward the transmitter, its purpose will be defeated.

Although fixed band-rejection filters are readily available using Bragg or long-period gratings impressed into the core of an optical fiber there are no simple, adjustable all-fiber band-rejection filters. Such filters would vary the amplitude of signals within a fixed wavelength range.

Although a variable transmission band-rejection filter of sorts can be made by varying the center wavelength of a Bragg or long-period grating, as one channel is attenuated another channel is unavoidably strengthened.

Accordingly, there is a need for a tunable band-rejection filter that changes its amplitude transmission over a specified wavelength range. There is a further need for a tunable band-rejection filter that has a reduced power consumption requirement for tuning. There is yet a further need for a tunable band-rejection filter that has a low insertion loss.

SUMMARY OF THE INVENTION

Accordingly, an object of the present invention is to provide an improved tunable band-rejection filter.

Another object of the present invention is to provide a tunable band-rejection filter that has a reduced power consumption requirement for tuning.

A further object of the present invention is to provide a tunable band-rejection filter that has a low insertion loss.

Yet another object of the present invention is to provide a tunable band-rejection filter that is small and compact.

A further object of the present invention is to provide a tunable band-rejection filter that has a fast response time.

These and other objects of the present invention are achieved in a dynamic gain flattening filter that includes a first filter stage. The first filter stage has a first tunable coupling member and a first differential delay with first and second tunable delay paths. The first tunable coupling member adjusts an amount of power of the optical signal that is divided onto the first and second tunable delay paths of the first differential delay.

In another embodiment of the present invention, a dynamic gain flattening filter includes a first filter stage and a first polarization splitter. The first filter stage has a first tunable coupling member and a first differential delay with first and second tunable delay paths. The first tunable coupling member adjusts an amount of power of the optical signal divided onto the first and second tunable delay paths of the first differential delay. The first polarization splitter splits the optical signal into two orthogonal polarizations.

DETAILED DESCRIPTION

Figure 1:
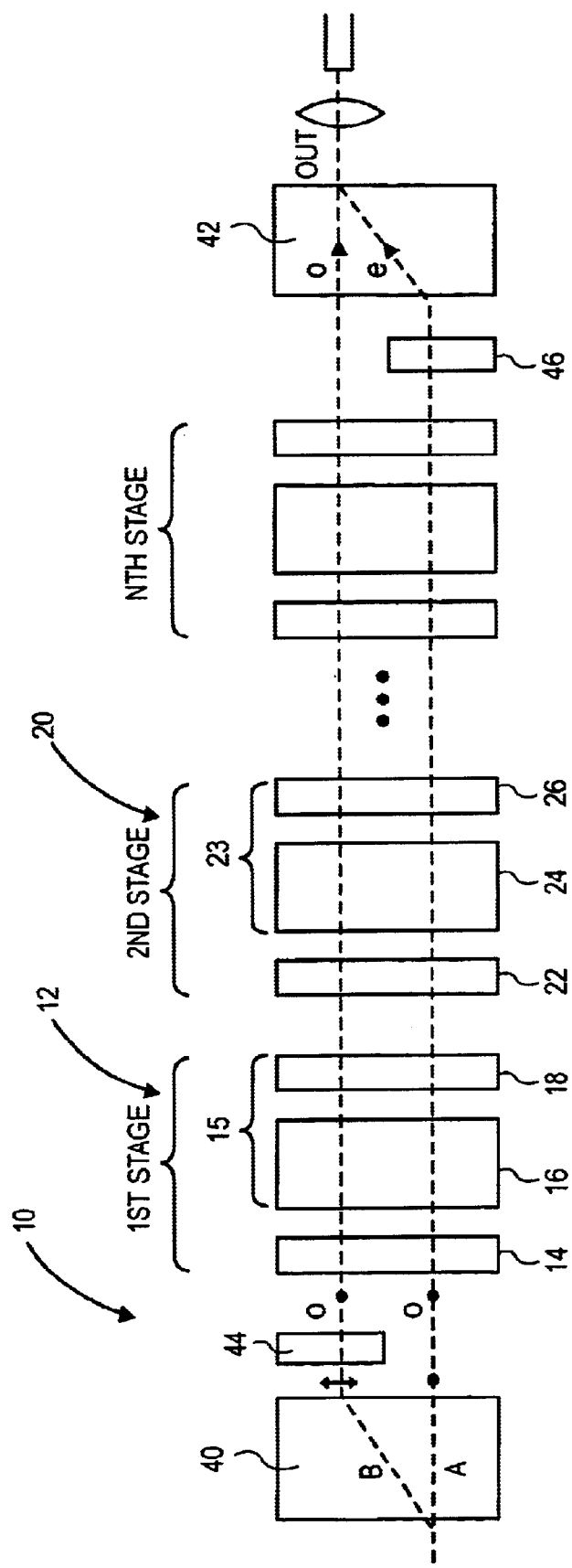
FIG. 1 is a schematic diagram of one embodiment of a dynamic gain flattening filter of the present invention.

Referring now to FIG. 1, one embodiment of a dynamic gain flattening filter 10 of the present invention includes a first filter stage 12 with a first tunable coupling member 14 and a first differential delay 15 with first and second tunable delay paths. First tunable coupling member 14 adjusts an amount of power of the optical signal that is divided onto the first and second tunable delay paths of first differential delay 15.

First differential delay 15 can include fixed portion and tunable portions. Alternatively, first differential delay 15 can have a first fixed differential delay 16 and a first tunable differential delay 18 with the first and second tunable delay paths. First fixed differential delay 16 sets a periodic variation in a power spectrum of the optical signal. First tunable differential delay 18 sets a phase of the periodic variation in the power spectrum of the optical signal.

First fixed differential delay 16 can be a birefringent material such as $LiNbO_3$, $TiO_2$ or calcite. Tunable differential delay 18 can be a liquid crystal cell that changes the differential delay between the two delay paths. First tunable coupling member 14 can be a liquid crystal cell that rotates the polarization angle of a linear input polarization.

First fixed differential delay 16 can be positioned between first tunable coupling member 14 and first tunable differential delay 18. First tunable differential delay 18 can be positioned between first tunable coupling member 14 and first fixed differential delay 16. The positions of first fixed differential delay 16 and first tunable differential delay can be switched.

Filter 10 can include one or more additional stages. For example, a second stage 20 can be coupled to first stage 12. Second stage 20 has a second tunable coupling member 22 and a first differential delay 23 with first and second tunable delay paths. Second tunable coupling member 22 adjusts an amount of power of the optical signal that is divided onto the first and second tunable delay paths of second differential delay 23.

Second differential delay 23 can include fixed and tunable portions. Alternatively, second differential delay 23 can have a second fixed differential delay 24 and a second tunable differential delay 26 with the first and second tunable delay paths. Second fixed differential delay 24 sets a periodic variation in a power spectrum of the optical signal. Second tunable differential delay 26 sets a phase of the periodic variation in the power spectrum of the optical signal.

Second fixed differential delay 24 can be positioned between second tunable coupling member 22 and second tunable differential delay 26. Second tunable differential delay 26 can be positioned between second tunable coupling member 22 and second fixed differential delay 24. Again, the position of second fixed differential delay 24 and second tunable differential delay 26 can be changed.

Additional stages can be added and provide more detailed filtering of the optical power spectrum. In one embodiment, filter 10 includes at least 4 or 5 stages.

Each differential delay 16, 18, 24 and 26 is polarization dependent. First and second fixed differential delays 16 and 24 each generate a time delay between first and second polarizations of the optical signal. First and second tunable differential delays 18 and 26 change an optical phase between first and second polarizations of the optical signal. First and second tunable coupling members 14 and 22 can be polarization state transformers that transform the incoming signal beam from one polarization state to a different polarization state. First and second tunable differential delays 18 and 26 modify first and second polarizations of the optical signal with different phase relationships.

Figure 2:
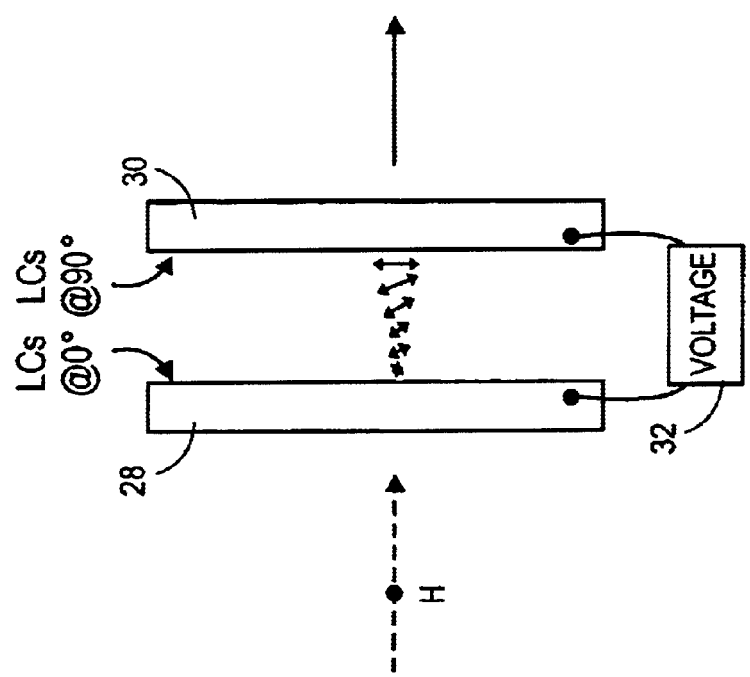
FIG. 2 is a schematic diagram of one embodiment of tunable coupling members from FIG. 1 with liquid crystal alignment members coupled to a voltage source.

In one embodiment, illustrated in FIG. 2, first and second tunable coupling members 14 and 22 can include first and second liquid crystal alignment members 28 and 30 coupled to a voltage source 32. Liquid crystals in contact with first and second liquid crystal alignment members 28 and 30 can be orientated, (i) at different angles with respect to each other, (ii) at the same angles with respect to each other or (iii) at an orthogonal angle with respect to each other.

Figure 3:
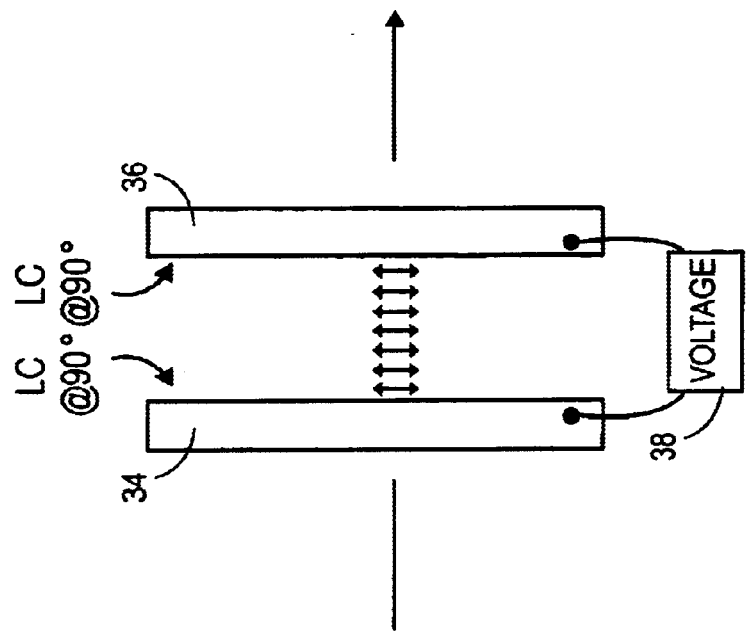
FIG. 3 is a schematic diagram of one embodiment of tunable delays from FIG. 1 with liquid crystal alignment members coupled to a voltage source.

As illustrated in FIG. 3, first and second tunable differential delays 18 and 26 can include first and second liquid crystal alignment members 34 and 36 coupled to a voltage application member 38. Liquid crystals in first and second liquid crystal alignment members 34 and 36 are orientated, (i) at the same angle with respect to each other, (ii) at different angles with respect to each other or (iii) at an orthogonal angle with respect to each other.

One or both of first and second tunable coupling members 14 and 22, and first and second tunable differential delays 18 and 26, can be, (i) a liquid crystal tuning element, (ii) a Faraday rotation member, (iii) an electro-optic member or (iv) a thermal tuning member.

Figure 4:
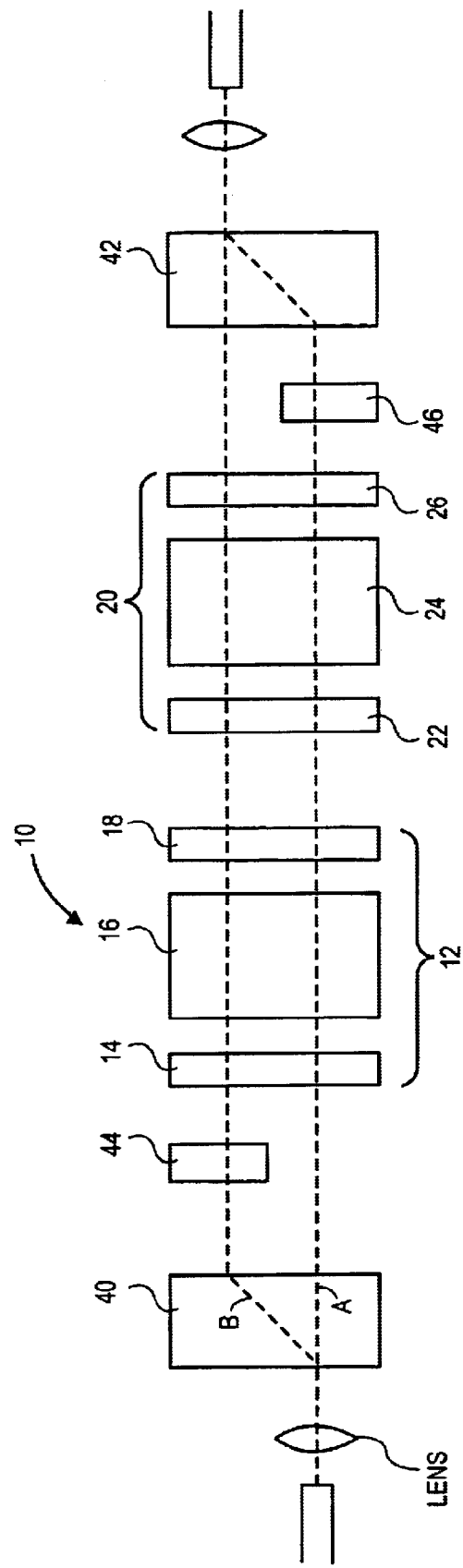
FIG. 4 is a schematic diagram of an embodiment of a dynamic gain flattening filter of the present invention that includes polarization splitters.

In another embodiment, illustrated in FIG. 4, filter 10 can also include a first polarization splitter 40 positioned adjacent to first filter stage 12. First polarization splitter 40 splits the optical signal into two orthogonal polarizations along paths A and B. First polarization splitter 40 can be a polarization walk-off crystal made of materials including but not limited to LiNbO$_3$, TiO$_2$ or calcite. First polarization splitter 40 can either split the two polarization states using spatial or angular walk-off.

A second polarization splitter 42 can be positioned adjacent to first stage 12. Second polarization splitter 42 combines the two orthogonal polarization paths A and B to create a dynamic tunable gain flattening filter 10 that has a transmission substantially independent of the input polarization state of the optical signal.

A first half-wave plate 44 can be positioned between first polarization splitter 40 and first stage 12 at one side and a second half-wave plate 46 can be positioned at the other side. First half-wave plate 44 alters one or both of the input polarizations to create two identical polarization states that travel independently through dynamic tunable gain flattening filter 10. Second half-wave plate 44 flips the polarizations so they are orthogonal and can be combined by second polarization splitter 40.

Second stage 20, and additional stages can also be included in the FIG. 4 embodiment. Second polarization splitter 42 can be positioned adjacent to second stage 20. Second polarization splitter 42 can be positioned between second stage 20 and second polarization splitter 42.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical apparatus, comprising:
    a first filter stage including,
    a first tunable coupling member;
    a first differential delay with first and second tunable delay paths; and
    wherein the first tunable coupling member adjusts an amount of power of an optical signal divided onto the first and second tunable delay paths of the first differential delay.

2. The optical apparatus of claim 1, wherein the first differential delay includes a fixed portion and a tunable portion.

3. The optical apparatus of claim 1, wherein the first differential delay includes a first fixed differential delay and a first tunable differential delay with respect to the first and second tunable delay paths.

4. The optical apparatus of claim 3, wherein the first fixed differential delay sets a periodic variation in a power spectrum of the optical signal.

5. The optical apparatus of claim 3, wherein the first tunable differential delay sets a phase of the periodic variation in the power spectrum of the optical signal.

6. The optical apparatus of claim 3, wherein the first fixed differential delay is positioned between the first tunable coupling member and the first tunable differential delay.

7. The optical apparatus of claim 3, wherein the first tunable differential delay is positioned between the first tunable coupling member and the first fixed differential delay.

8. The optical apparatus of claim 1, further comprising:
    a second stage including;
    a second tunable coupling member;
    a second differential delay with first and second tunable delay paths; and
    wherein the second tunable coupling member adjusts an amount of power of the optical signal divided onto the first and second tunable delay paths of the second differential delay.

9. The optical apparatus of claim 8, wherein the second differential delay includes a fixed portion and a tunable portion.

10. The optical apparatus of claim 8, wherein the second differential delay includes a second fixed differential delay and a second tunable differential delay with the first and second tunable delay paths.

11. The optical apparatus of claim 10, wherein the second fixed differential delay sets a periodic variation in a power spectrum of the optical signal.

12. The optical apparatus of claim 10, wherein the second tunable differential delay sets a phase of the periodic variation in the power spectrum of the optical signal.

13. The optical apparatus of claim 10, wherein the second fixed differential delay is positioned between the second tunable coupling member and the second tunable differential delay.

14. The optical apparatus of claim 10, wherein the second tunable differential delay is positioned between the second tunable coupling member and the second fixed differential delay.

15. The optical apparatus of claim 3, wherein each of the differential delays is a polarization dependent differential delay.

16. The optical apparatus of claim 3, wherein the first fixed differential delay generates a time delay between first and second polarizations of the optical signal.

17. The optical apparatus of claim 3, wherein the first tunable differential delay changes an optical phase between first and second polarizations of the optical signals.

18. The optical apparatus of claim 3, wherein the first tunable coupling member is a polarization state transformer that transform the incoming signal beam from one polarization state to a different polarization state.

19. The optical apparatus of claim 3, wherein the first tunable differential delay modifies first and second polarizations of the optical signal with different phase relationships.

20. The optical apparatus of claim 3, wherein the first tunable coupling member includes first and second liquid crystal alignment members coupled to a voltage source.

21. The optical apparatus of claim 20, wherein liquid crystals in the first and second liquid crystal alignment members are oriented at different angles with respect to each other.

22. The optical apparatus of claim 20 wherein liquid crystals in the first and second liquid crystal alignment members are orientated at the same angle with respect to each other.

23. The filter optical apparatus of claim 20, wherein liquid crystals in the first liquid crystal alignment member are oriented orthogonal to liquid crystals in the second liquid crystal alignment member.

24. The optical apparatus of claim 3, wherein the first tunable differential delay includes first and second liquid crystal alignment members coupled to a voltage application member.

25. The optical apparatus of claim 24, wherein liquid crystals in the first and second liquid crystal alignment members are orientated at the same angle.

26. The optical apparatus of claim 24, wherein liquid crystals in the first and second liquid crystal alignment members are orientated at different angles with respect to each other.

27. The optical apparatus of claim 3, wherein at least one of the tunable coupling members and the tunable differential delays is a liquid crystal tuning element.

28. The optical apparatus of claim 3, wherein at least one of the tunable coupling members and the tunable differential delays is a Faraday rotation member.

29. The optical apparatus of claim 3, wherein at least one of the tunable coupling members and the tunable differential delays is an electro-optic member.

30. The optical apparatus of claim 3, wherein at least one of the tunable coupling members and the tunable differential delays is a thermal tuning member.

31. An optical apparatus, comprising:
    a first stage including,
        a first tunable coupling member;
        a first differential delay with first and second tunable delay paths;
        wherein the first tunable coupling member adjusts an amount of power of an optical signal divided onto the first and second tunable delay paths of the first differential delay and
    a first polarization splitter positioned adjacent to the first stage, the first polarization splitter splitting the optical signal into two orthogonal polarizations.

32. The optical apparatus of claim 31, wherein the first differential delay includes a fixed portion and a tunable portion.

33. The optical apparatus of claim 31, wherein the first differential delay includes a first fixed differential delay and a first tunable differential delay with the first and second tunable delay paths.

34. The optical apparatus of claim 33, wherein the first fixed differential delay sets a periodic variation in a power spectrum of the optical signal.

35. The optical apparatus of claim 33, wherein the first tunable differential delay sets a phase of the periodic variation in the power spectrum of the optical signal.

36. The optical apparatus of claim 31, wherein the first polarization splitter is a polarization walk-off crystal.

37. The optical apparatus of claim 31, wherein the first polarization splitter is a polarization beam splitter.

38. The optical apparatus of claim 33, wherein the first fixed differential delay is positioned between the first tunable coupling member and the first tunable differential delay.

39. The optical apparatus of claim 33, wherein the first fixed differential delay is positioned between the first tunable coupling member and the first tunable differential delay.

40. The optical apparatus of claim 31, further comprising:
    a first half-wave plate positioned between the first polarization splitter and the first stage.

41. The optical apparatus of claim 31, further comprising:
    a second stage including:
    a second tunable coupling member;
    a second differential delay with first and second tunable delay paths; and
    wherein the second tunable coupling member adjusts an amount of power of the optical signal divided onto the first and second tunable delay paths of the second differential delay.

42. The optical apparatus of claim 41, wherein the second differential delay includes a fixed portion and a tunable portion.

43. The optical apparatus r of claim 41, wherein the second differential delay includes a second fixed differential delay and a second tunable differential delay with the first and second tunable delay paths.

44. The optical apparatus of claim 43, wherein the second fixed differential delay sets a periodic variation in a power spectrum of the optical signal.

45. The optical apparatus of claim 43, wherein the second tunable differential delay sets a phase of the periodic variation in the power spectrum of the optical signal.

46. The optical apparatus of claim 43, wherein the second fixed differential delay is positioned between the second tunable coupling member and the second tunable differential delay.

47. The optical apparatus of claim 43, wherein the second tunable differential delay is positioned between the second tunable coupling member and the second fixed differential delay.

48. The optical apparatus of claim 43, further comprising:
    a second polarization splitter positioned adjacent to the first stage, the second polarization splitter combining the two orthogonal polarizations.

49. The optical apparatus of claim 48, further comprising:
    a first half-wave plate positioned between the first polarization splitter and the first stage; and
    a second half-wave plate positioned between the second walk-off crystal and the second stage.

50. The optical apparatus of claim 48, wherein the first and second orthogonal polarizations of the optical signal travel independently through the first and second tunable differential delays.

51. The optical apparatus of claim 43, wherein each of the differential delays is a polarization dependent differential delay.

52. The optical apparatus of claim 43, wherein the first fixed differential delay generates a time differential delay between first and second polarizations of the optical signal.

53. The optical apparatus of claim 43, wherein the first tunable differential delay changes an optical phase between first and second polarizations of the optical signal.

54. The optical apparatus of claim 43, wherein the first tunable coupling member is a polarization state transformer that transform the incoming signal beam from one polarization state to a different polarization state.

55. The optical apparatus of claim 43, wherein the first tunable differential delay modifies first and second polarizations of the optical signal with different phase relationships.

56. The optical apparatus of claim 43, wherein the first tunable coupling member includes first and second liquid crystal alignment members coupled to a voltage source.

57. The optical apparatus of claim 56, wherein liquid crystals in the first and second liquid crystal alignment members are orientated at different angles with respect to each other.

58. The optical apparatus of claim 56, wherein liquid crystals in the first liquid crystal alignment member are orientated at 0° and the liquid crystals in the second liquid crystal alignment member are orientated at 90°.

59. The optical apparatus of claim 43, wherein the first tunable differential delay includes first and second liquid crystal alignment members coupled to a voltage application member.

60. The optical apparatus of claim 59, wherein liquid crystals in the first and second liquid crystal alignment members are orientated at the same angle.

61. The optical apparatus of claim 59, wherein liquid crystals in the first and second liquid crystal alignment members are orientated at an orthogonal angle to each other.

62. The optical apparatus of claim 43, wherein each of the tunable coupling members and the tunable differential delays is a liquid crystal tuning element.

63. The optical apparatus of claim 43, wherein at least one of the tunable coupling members and the tunable differential delays is a Faraday rotation member.

64. The optical apparatus of claim 43, wherein at least one of the tunable coupling members and the tunable differential delays is a electro-optic member.

65. The optical apparatus of claim 43, wherein at least one of the tunable coupling members and the tunable differential delays is a thermal tuning member.

* * * * *